United States Patent Office 3,250,823
Patented May 10, 1966

3,250,823
BLENDS OF POLYAMIDE, POLYCARBONATE OR POLYOXYMETHYLENE RESINS WITH POLYETHYLENE-MALEATE GRAFT COPOLYMER
Robert J. Zeitlin, Bloomfield, N.J., assignor to W. R. Grace & Co., a corporation of Connecticut
No Drawing. Filed June 4, 1962, Ser. No. 199,591
12 Claims. (Cl. 260—857)

The present invention relates to novel and useful compositions and to a process for preparing the compositions. More particularly, it relates to plastic compositions containing a polyethylene/maleate diester graft copolymer and to a process of preparing such a plastic composition.

Polycarbonamides, polycarbonates and polyoxymethylenes are polymers which are well known and have received widespread acceptance in the art due to their excellent chemical and physical properties. Such polymers are disclosed in U.S. Patents 2,071,250, 2,071,253, 2,130,-523, 2,130,948, 2,190,770, 2,252,555, 2,252,557, 2,374,137, 2,385,890, 2,768,994, 3,027,352, 3,028,365 and others. While the market for these polymers has grown steadily over the years, the quite high cost of the resins has precluded their use in many instances where price is a prime consideration. Also, parts molded from the resins, while quite strong, are substantially inextendible and are generally unsuited for use where the parts are subject to deformation. In addition, some of the materials, such as the polyoxymethylenes, are not readily susceptible to compression molding and in general are not recommended for such a process. In order to modify the properties of such resins, various mixtures have been tried which incorporate a cheaper plastic such as high density polyethylene as a filler or modifying agent (see Canadian Patent 636,450). In general, such mixtures have proved unacceptable for in many cases the added resin is incompatible with the original resin or requires special compounding procedures. Obviously, a cheaper plastic which would modify the physical properties of such resins and could be incorporated into the resin in all proportions would produce a highly desirable composition.

It is an object of the present invention to provide a composition containing a polycarbonamide, polycarbonate or polyoxymethylene and a graft copolymer of polyethylene, which materials are compatible in all proportions. Another object is to modify the physical properties of polymers by incorporating a second polymeric material into the polymer composition. A further object is to increase the flexibility and extendibility of certain polymers. Another object is to provide a polyoxymethylene composition having improved flow characteristics. Another object is to provide a composition which is readily processible by compression molding but which contains a material which is normally unsuitable for compression molding. A still further object is to provide a filler material which is suitable for the dilution of expensive polymers. A further object is to provide a process for producing novel polymer compositions. Another object is to provide an inexpensive process for producing polymer blends such as mixtures and alloys by the use of conventional mixing equipment. Other objects will become apparent as the description of the invention proceeds.

These objects are accomplished by the present invention which provides a polymer composition comprising a blend of (1) a polymer selected from the group consisting of a polycarbonamide, polycarbonate and polyoxymethylene and (2) a graft copolymer of (A) a polyethylene polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight.

The present invention also provides a process for producing a polymer blend which comprises mixing (1) a polymer selected from the group consisting of a polycarbonamide, polycarbonate and polyoxymethylene and (2) a graft copolymer of (A) a polyethylene polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight.

In a preferred embodiment of the present invention the composition is an alloy of a polycarbonamide and the polyethylene/maleic acid diester graft copolymer with both ingredients being present in amounts of from about 5 to about 95%. In a still more preferred embodiment of the present invention, the graft copolymer is present in amounts of from 5 to 50% and the maleic acid diester is either dibutyl maleate or diethyl maleate which is present in the graft copolymer in amounts of from about 3 to about 10% by weight.

The term "blend" is used to include both a "mixture" and an "alloy." The term "mixture" signifies a physical admixture of powders, particles or the like to distinguish it from an "alloy" which signifies a homogeneous mass of the materials, preferably in pellet form, which may be obtained by heating such materials to the melting or softening point with stirring to insure homogeneity and then forming the mass into the desired form.

The polycarbonamides which may be employed in the present invention are any of the polymers having recurring amide units as an integral part of the main polymer chain. Such polymers are well known in the art and are described in U.S. Patents 2,071,250, 2,071,253, 2,130,523, 2,130,948, 2,190,770, 2,252,555, 2,252,557, 2,374,137, 2,385,890 and others. Specific preparations of some of the more common polycarbonamides are also described in "Preparative Methods of Polymer Chemistry" by Sorenson and Campbell, 1961, pp. 60–70.

The polycarbonates employed in the present invention are any of those well known in the art. Suitable polycarbonates, for example, are described in "Modern Plastic," April 1958, p. 131; "Industrial and Engineering Chemistry," vol. 51, No. 2, February 1959, p. 157, and U.S. Patent 3,028,365.

The polyoxymethylenes which may be utilized in the compositions of the present invention are any of the high molecular weight polymers having the recurring $$(-CH_2O-)$$

units in the polymer chain. Among the suitable polyoxymethylenes are those described in U.S. Patents 2,768,994 and 3,027,352.

The terminology "graft copolymer" is employed to signify that the monomeric material (maleic acid diester) reacts with the residual unsaturated groups in the polymer (polyethylene) to couple or form branches which extend the polymer chains rather than crosslink the chains with the formation of insoluble "gel."

The expression "a polyethylene polymer having a density of at least about 0.940 and containing at least about 90% by weight of ethylene in the polymer chain" signifies the conventional polyethylenes as described, for example, in U.S. Patents 2,949,447 and 2,825,721. The polymer, therefore, may be the polyethylene homopolymer or a copolymer obtained by reacting ethylene with a comonomer such as propylene; butene-1; butene-2; 3-methyl butene-1; pentene-1; hexene-1; 1,3-butadiene and the like, as well as mixtures of such comonomers. Other equally suitable comonomers are described in the aforementioned patents.

The "blend," including both mixtures and alloys, may be formed by mixing particles of the individual components with or without heating. Preferably, the mixing is carried out at a temperature above the softening point of the composition so that an intimate alloy of the polymeric constituents is formed. In general, the heating should be to a temperature above about 115° C. and it is preferred to use temperatures ranging from about 150° C. to about 270° C. Temperatures substantially above about 325° C. are generally to be avoided in order to avoid substantial decomposition of the polymeric ingredients. However, if the decomposition products are not undesirable in the composition, higher temperatures may be employed.

The term "recovering" is employed in its broadest sense to include any system which utilizes the alloy formed in the process. Thus, the term includes recovery of the alloy in the form of pellets, powders and the like, as well as shaped articles formed directly from the molten polymer such as sheets, films, tubing, molded articles and the like.

A convenient method of preparing the desired alloy is to premix the ingredients in finely divided form and then extrude the composition through a heated extruder. Other means, such as a Banbury mixer, mills and the like may also be employed for the alloy. When a physical admixture is desired, any of the conventional pieces of equipment for forming physical mixtures may be employed.

The graft copolymers employed in the present invention are prepared by heating a composition comprising (A) from about 70 to about 99% by weight of a polyethylene polymer having a density of at least about 0.940 and containing at least about 90% by weight of ethylene in the polymer chain and (B) from about 0.5 to about 30% by weight of a maleic acid diester, to a temperature above the melting point of the said polyethylene polymer, mixing the molten composition in the presence of at least about 0.02% by weight, based on the weight of said composition, of a hydroperoxide having a half life of at least one minute at 145° C. and thereafter recovering the resulting graft copolymer.

The "maleic acid diesters" suitable for use in forming the graft coplymer are any having the formula

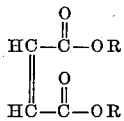

wherein each R is an organic radical. Among the various maleate diesters suitable for use in the present invention are: dimethyl maleate; dipropyl maleate; diisobutyl maleate; dibutyl maleate; dipentyl maleate; dicyclopentyl maleate; dihexyl maleate; dicyclohexyl maleate; dioctyl maleate; didodecyl maleate; dibenzyl maleate; di(2-phenylethyl) maleate; di(2-ethylhexyl) maleate; di(tetrahydrofurfuryl) maleate; p-chlorophenyl methyl mateate; methyl ethyl maleate; ethyl butyl maleate; propyl cyclohexyl maleate; phenyl ethyl maleate and the like. In a preferred embodiment of the present invention, each alcohol residue of the maleate diester is a hydrocarbon radical which contains from about 4 to about 18 carbon radicals.

Any of the hydroperoxides known in the art which have a half life of at least one minute at 145° C. may be employed for forming the graft copolymer employed in the present invention. Such hydroperoxides have the general formula R—O—OH, wherein R is an organic radical. Among the suitable hydroperoxides are t-butyl hydroperoxide; p-menthane hydroperoxide; pinane hydroperoxide; and cumene hydroperoxide as well as others known in the art.

In carrying out the preparation of the polyethylene graft copolymer, the components of the composition are merely mixed and heated to a temperature above the melting point of the polyethylene polymer. The elevated temperature causes rapid decomposition of the hydroperoxide with formation of the graft copolymer. Obviously, the more homogeneous the mixture prior to heating, the less mixing will be required of the molten composition. However, in order to obtain a desirable conversion, it has been found that some form of mixing is highly desirable even when a uniform mixture of all the components of the composition is formed prior to heating. In general, the composition should be heated to a temperature above about 130° C. and it is preferred to use temperatures ranging from about 270 to about 320° C. Temperatures substantially above about 325° C. are generally to be avoided in order to avoid substantial decomposition of the polymeric ingredients. However, if the decomposition products are not undesirable in the product, higher temperatures may be employed. The reaction time required is quite short, being of the magnitude of from a few seconds to about twenty minutes, although extended heating times do not substantially affect the product and may be employed when desired.

The preparation of the graft copolymer is completely described in copending application, Serial No. 195,987 filed May 18, 1962.

In the specification and claims all parts are expressed in parts by weight unless otherwise stated.

The density is given in grams per cubic centimeter at 23° C. as measured in a density gradient column such as that described in "Journal of Polymer Science," vol 21, p. 144, 1956.

The following examples are given to illustrate the invention and are not intended to limit it in any manner.

In the examples, the melt index is reported in decigrams per minute and is determined by the standard ASTM-D-1238-59T test unless otherwise reported. However, for polymers having a 0.0 melt index according to this method, a modified method, designated $MI_{21}$ is sometimes employed which utilizes a 21,600 gram weight rather than the 2,160 gram weight as in the aforementioned test. All other conidtions of the standard test remain the same in the modified procedure. This test merely gives a better indication of the melt index of materials which give a 0.0 measurement by the standard test.

The percent elongation, the tensile strength at yield in p.s.i. and the ultimate tensile strength in p.s.i. are measured by the standard ASTM-D-638-60T test.

The "high density" polyethylene polymers employed in the examples are prepared according to the process set forth in U.S. Patent 2,949,447 or 2,825,721. When employing the process of U.S. Patent 2,949,447, a pressure of about 450 p.s.i. is employed with a temperature of 205-210° F., a reaction time of about 2 hours and chromium oxide supported on silica/alumina as the catalyst. When employing the procedure of U.S. Patent 2,825,721, a pressure of about 450 p.s.i. is employed with a reaction time of about 2 hours and chromium oxide supported on silica/alumina as the catalyst. The polymerization temperature utilized in this procedure is indicated in the examples.

In the examples, the melting point of the polymer is determined by the conventional procedure employing a polarizing microscope. The amount of the maleate diester actually incorporated into the polymer is determined on a weight-percentage basis employing infrared analysis (Perkin-Elmer Model 21 Spectrometer).

The extruders employed in the examples are of the tubular type with a screw feed. While two different extruders are actually employed in the examples, the heating chamber of each contains a plurality of zones which are maintained at different temperatures by means of an electric heating element surrounding each zone. The temperature profile is given from Zone 1 (the feed end of the machine) to the zone immediately adjacent to the extrusion die.

The 6–6 nylon, or poly(hexamethylene adipamide), employed in the examples is prepared in accordance with U.S. Patent 2,130,948 to give a polymer having a relative viscosity of about 35–40 (as referred to in U.S. Patent 2,385,890). The 6 nylon, or polycaproamide, and the 11 nylon, or poly(11-undecanoamide), are prepared in accordance with the procedures set forth in "Preparative Methods of Polymer Chemistry" by Sorenson & Campbell, 1961, pp. 69 and 236–7. Other procedures for preparing these same well known polycarbonamides are given in the aforementioned patents.

The polycarbonate employed in the examples is prepared from bisphenol A in accordance with the procedure set forth in "Modern Plastics" by R. J. Thompson and K. B. Goldblum, April 1958, p. 131, to give a light amber transparent resin having the following properties: crystalline melting point=514° F.; specific gravity=1.20 (ASTM-D-792); a melt viscosity at 300° C.=4,000 to 6,000 poises; specific heat=0.30; impact strength, notched Izod, ⅛ inch specimen=12–16 ft.-lb./in. of notch (ASTM-D-256); refractive index at 25° C.=1.584; tensile impact=600–900 ft.-lb./cubic in.; tensile strength at yield=8,000–9,000 p.s.i. (ASTM-D-638); ultimate tensile strength=9,000–10,500 p.s.i. (ASTM-D-638); tensile modulus=320,000 p.s.i. (ASTM-D-638); elongation=60–100% (ASTM-D-638); compressive strength =11,000 p.s.i. (ASTM-D-695); compressive modulus=241,000 p.s.i. (ASTM-D-695); flexural modulus=375,000 p.s.i. (ASTM-D-695); shear strength at yield=5,400 p.s.i. (ASTM-D-732); ultimate shear strength=9,200 p.s.i. (ASTM-D-732); water absorption, 24 hour immersion=about 0.3% (ASTM-D-570); modulus of rigidity=116,000 p.s.i.; and coefficient of linear thermal expansion=$7 \times 10^{-5}$ in./in./° C. (ASTM-D-697).

The polyoxymethylene employed in the examples is prepared in accordance with U.S. Patent 2,768,994, to give a polymer having the following properties: melting point (crystalline)=347° F.; flow temperature=363° F. (ASTM-D-569); specific gravity=1.425 (ASTM-D-792); specific heat=0.35 B.t.u./lb./° F.; elongation at 73° F.=75 (ASTM-D-638); Izod impact strength at 73° F.=2.3 (ASTM-D-256); tensile strength at yield point at 73° F.=10,000 (ASTM-D-638); compressive strength at 1% deformation=5,200 (ASTM-D-695); flexural modulus at 73° F.=410,000 (ASTM-D-790); flexural strength=14,000 (ASTM-D-790); shear strength=9,510 (ASTM-D-732); heat distortion temperature at 264 p.s.i.=212° F. (ASTM-D-648); flammability=1.1 (ASTM-D-635); deformation under load (2,000 p.s.i. at 122° F.)=0.5% (ASTM-D-621); coefficient of linear thermal expansion=$4.5 \times 10^{-5}$ per ° F. and modulus of rigidity=178,000 p.s.i.

*Example 1.—Preparation of polyethylene/butene-1/dibutyl maleate graft copolymer*

A high density polyethylene copolymer containing about 1.59% of butene-1 is prepared in accordance with U.S. Patent 2,949,447, as previously described, to give a copolymer having a density of 0.943, a melt index of 0.0 and an $MI_{21}$ of 1.6.

848 pounds of the polyethylene copolymer are mixed in a ribbon blender with a solution of 150 pounds of dibutyl maleate and 2 pounds of t-butyl hydroperoxide. The homogeneous mixture is fed into a "Hartig" 2½ inch extruder having a length to diameter ratio of 20 to 1 and equipped with electric temperature controls covering 3 heating zones. The temperature profile is: Zone 1=345° F.; Zone 2=670° F.; Zone 3=395° F. and die temperature=300° F. The die produces three strands at an extrusion rate of about 43 pounds per hour employing a pressure of 250 to 500 pounds per square inch. The strands are cut into pellets having a size of from about 1/10 to ¼ inch.

The resulting polyethylene/butene-1/dibutyl maleate graft copolymer has a density of 0.948, a melting point of 116–117° C., a melt index of 1.0 and copolymerizes to the extent that it contains 5.0% by weight of dibutyl maleate. The solubility test in boiling xylene shows that no "gel" (i.e., crosslinked material) has formed in the product.

*Preparation of graft copolymer/6 nylon blends.*—Approximately 990 grams of the resulting pellets of the polyethylene/butene-1/dibutyl maleate graft copolymer are mixed with 10 grams of extrusion grade pellets (1/10 to ¼ inch) of the 6 nylon (previously described) to form a homogeneous mixture. The mixture is then fed into a "Sterling" one inch extruder having a length to diameter radio of 24 to 1 and equipped with electric temperature controls covering 3 heating zones. The temperature profile is: Zone 1=390–405° F.; Zone 2=510–520° F.; Zone 3=490–500° F. and die temperature=500–510° F. The die produces a single strand of the alloy at an extrusion rate of about 2.5 to about 3.5 pounds per hour employing a back pressure of about 850–950 p.s.i. The strand is cut into pellets having a size of from about ¼ to about 1/16 inch.

About 24 grams of the resulting pellets are compression molded onto 0.02″ x 8″ x 8″ plaques by pressing them in a mold (preheated to a temperature of about 500° F.) of 4 minutes at 1 ton pressure. The pressure is then increased to 15 tons. The mold is "bumped" by reducing the pressure to 5 tons and increasing it again to 15 tons. The "bumping" is done 3 times and then heated for 5 minutes at 15 tons pressure. The mold is cooled by trickling water through the press (Pasedena Hydraulic Co. press) until the mold is at room temperature.

The properties of the plaques from the alloy are given in Table I.

*Procedure A and B: Controls.*—As a control to the preceding procedure, a high density polyethylene copolymer containing about 1.59% of butene-1 is prepared in accordance with U.S. Patent 2,825,721, as previously described, at a temperature of about 258° F. so as to give a polyethylene/butene-1 copolymer having a density of 0.950, a melting point of about 127–128° C. and a melt index of 0.04.

Pellets of the polymer are mixed and alloyed with the 6 nylon and then molded into plaques according to the method set forth in Example 1. In Procedure A, 90% of the polyethylene/butene-1 copolymer is alloyed with 10% of the 6 nylon. In Procedure B, 75% of the polyethylene/butene-1 copolymer is alloyed with 25% of the 6 nylon.

The materials of the alloys are not compatible in either the A or B plaques and both samples flake when bent.

The properties of the plaques from the two alloys are given in Table I.

*Procedure C: Control.*—As a control to the preceding procedure, the 6 nylon pellets are processed and compression molded into plaques according to the method set forth in Example 1 with the exception that no back pressure is required in the extruder as the 6 nylon readily flows at the extrusion temperature.

The properties of the plaques are given in Table I.

*Examples 2 to 4*

The procedure of Example 1 is repeated employing 2, 3 and 4% by weight, respecively, of the 6 nylon.

The properties of the resulting plaques are given in Table I.

*Example 5*

The procedure of Example 1 is repeated employing 5% by weight of the 6 nylon. The procedure, however, is modified in that a back pressure of 1,300 p.s.i. is utilized in the extruder. The pellets are molded into plaques according to the procedure of Example 1.

The properties of the resulting plaques are given in Table I.

*Examples 6 to 8*

The procedure of Example 1 is repeated employing 10, 15 and 25% by weight, respectively, of the 6 nylon.

The properties of the resulting plaques are given in Table I.

*Example 9*

The procedure of Example 1 is repeated employing 35% by weight of the 6 nylon. The procedure, however, is modified in that a back pressure of 1,150 p.s.i. is utilized in the extruder. The pellets are molded into plaques according to the procedure of Example 1.

The properties of the resulting plaques are given in Table I.

*Example 10*

The procedure of Example 1 is repeated employing 50% by weight of the 6 nylon. The procedure, however, is modified in that a back pressure of 1,500 p.s.i. is utilized in the extruder. The pellets are molded into plaques according to the procedure of Example 1.

The properties of the resulting plaques are given in Table I.

*Example 11*

The procedure of Example 1 is repeated employing 70% by weight of the 6 nylon. The procedure, however, is modified in that a back pressure of 1,050 p.s.i. is utilized in the extruder. The pellets are molded into plaques according to the procedure of Example 1.

The properties of the resulting plaques are given in Table I.

*Example 12*

The procedure of Example 1 is repeated employing 90% by weight of the 6 nylon. The procedure, however, is modified in that a back pressure of 1,100 p.s.i. is utilized in the extruder. The pellets are molded into plaques according to the procedure of Example 1.

The properties of the resulting plaques are given in Table I.

117° C., a melt index of 0.05 and copolymerizes to the extent that it contains 3.7% of diethyl maleate.

*Preparation of graft copolymer/6–6 nylon blends.—*
Approximately 485 grams (97%) of the resulting pellets of the polyethylene/diethyl maleate graft copolymer are mixed with 15 grams (3%) of pellets (1/10 to 1/4 inch) of a general purpose 6–6 nylon resin (previously described) to form a homogeneous mixture. The mixture is then fed into a "Sterling" one inch extruder having a length to diameter ratio of 24 to 1 and equipped with electric temperature controls covering 3 heating zones. The temperature profile is: Zone 1=440° F.; Zone 2=500° F.; Zone 3=500° F. and die temperature=510° F. The die produces a single strand of the alloy at an extrusion rate of about 2.5 to 3.5 pounds per hour employing a back pressure of about 900 p.s.i. The strand is cut into pellets having a size of from about 1/4 to 1/16 inch.

The resulting pellets are compression molded into plaques according to the procedure of Example 1.

The properties of the plaques are given in Table II.

*Example 14*

The procedure of Example 13 is repeated employing 10% by weight of the 6–6 nylon. The procedure, however, is modified in that a back pressure of 1,000 p.s.i. is utilized in the extruder. The pellets are molded into plaques according to the procedure of Example 1.

The properties of the resulting plaques are given in Table II.

*Example 15*

The procedure of Example 13 is repeated employing 25% by weight of the 6–6 nylon. The pellets are molded into plaques according to the procedure of Example 1.

TABLE I

| Example No. | Weight percent of graft copolymer | Weight percent of polyethylene | Weight percent of 6 nylon | Ultimate tensile strength, p.s.i. | Tensile strength at yield, p.s.i. | Percent elongation |
|---|---|---|---|---|---|---|
| 1 | 99 |  | 1 | 2,600 | 2,950 | 1,300 |
| Control A |  | 90 | 10 |  | 3,310 | 7 |
| Control B |  | 75 | 25 |  | 3,074 | 5 |
| Control C |  |  | 100 |  | 10,720 | 17 |
| 2 | 98 |  | 2 | 2,700 | 3,440 | 1,420 |
| 3 | 97 |  | 3 | 2,700 | 3,070 | 1,380 |
| 4 | 96 |  | 4 | 3,050 | 3,480 | 1,350 |
| 5 | 95 |  | 5 | 2,920 | 3,590 | 1,280 |
| 6 | 90 |  | 10 | 2,760 | 2,650 | 740 |
| 7 | 85 |  | 15 | 2,820 | 2,820 | 710 |
| 8 | 75 |  | 25 | 3,050 | 2,575 | 90 |
| 9 | 65 |  | 35 |  | 3,990 | 25 |
| 10 | 50 |  | 50 |  | 5,540 | 20 |
| 11 | 30 |  | 70 |  | 6,980 | 16 |
| 12 | 10 |  | 90 |  | 10,220 | 16 |

*Example 13.—Preparation of polyethylene/diethyl maleate graft copolymer*

A high density polyethylene homopolymer is prepared in accordance with U.S. Patent 2,825,721, as previously described, employing a temperature of about 262° F. so as to give a homopolymer having a density of 0.960 and a melt index of 0.2.

800 grams of the polyethylene homopolymer are mixed in a ribbon blender with a solution of 190 grams of diethyl maleate and 10 grams of t-butyl hydroperoxide. The homogeneous mixture is fed into a "Sterling" one inch extruder having a length to diameter ratio of 24 to 1 and equipped with electric temperature controls covering 3 heating zones. The feed end is cooled with tap water. The temperature profile is: Zone 1=289° F.; Zone 2=410° F.; Zone 3=400° F. and die temperature=360° F. A pressure of about 2,200 p.s.i. is employed in the extruder. The die produces a single strand which is cut into pellets having a size of from about 1/4 to 1/16 inch.

The resulting polyethylene/diethyl maleate graft copolymer has a density of 0.955, a melting point of 116–

The properties of the resulting plaques of the alloy are given in Table II.

*Example 16*

The procedure of Example 13 is repeated employing 50% by weight of the 6–6 nylon. The procedure, however, is modified in that a back pressure of about 1,200 p.s.i. is utilized in the extruder. The pellets are molded into plaques according to the procedure of Example 1.

The properties of the resulting plaques are given in Table II.

TABLE II

| Example No. | Weight percent of graft copolymer | Weight percent of 6–6 nylon | Tensile strength at yield, p.s.i. | Percent elongation |
|---|---|---|---|---|
| 13 | 97 | 3 | 2,410 | 845 |
| 14 | 90 | 10 | 2,300 | 580 |
| 15 | 75 | 25 | 2,560 | 20 |
| 16 | 50 | 50 | 4,000 | 15 |

Example 17

The procedure of Example 13 is repeated employing 250 grams (50%) of the polyethylene/diethyl maleate graft copolymer and 250 grams (50%) of the pellets of 11 nylon (previously described). The procedure, however, is modified in that a back pressure of 1,600 p.s.i. is utilized with a temperature profile of the extruder of: Zone 1=390° F.; Zone 2=410° F.; Zone 3=430° F. and die temperature=430° F. The pellets of the alloy are molded into plaques according to the procedure of Example 1.

The resulting plaques are smooth and even in appearance and do not flake when bent.

Example 18

A high density polyethylene/butene-1/dibutyl maleate graft copolymer is prepared and made into pellets in accordance with the procedure of Example 1.

Approximately 950 grams (95%) of the resulting pellets of the polyethylene/butene-1/dibutyl maleate graft copolymer are mixed with 50 grams (5%) of pellets (1/10 to 1/4 inch) of the polycarbonate (previously described) to form a homogeneous mixture. The mixture is then fed into a "Sterling" one inch extruder having a length to diameter ratio of 24 to 1 and equipped with electric temperature controls covering 3 heating zones. The temperature profile is: Zone 1=390° F.; Zone 2=550–560° F.; Zone 3=520–530° F. and die temperature=520° F. The die produces a single strand of the alloy at an extrusion rate of about 2.5 to about 3.5 pounds per hour employing a back pressure of about 1,800 p.s.i. The strand is cut into pellets having a size of from about 1/4 to about 1/16 inch.

About 24 grams of the pellets of the alloy are compression molded into plaques according to the procedure of Example 1.

The properties of the plaques are given in Table III.

*Procedure A: Control.*—As a control to the preceding procedure, pellets of the polycarbonate resin are processed and formed into plaques according to the preceding procedure but utilizing no polyethylene/butene-1/dibutyl maleate graft copolymer. The procedure, however, is modified in that a back pressure of 4,000 p.s.i. is utilized in the extruder with a temperature profile of: Zone 1=440° F.; Zone 2=570° F.; Zone 3=515° F. and die temperature=510° F.

The properties of the plaques are given in Table III.

Example 19

The procedure of Example 18 is repeated employing 900 grams (90%) of the polyethylene/butene-1/dibutyl maleate graft copolymer and 100 grams (10%) of the polycarbonate resin.

The properties of the resulting plaques of the alloy are given in Table III.

Example 20

The procedure of Example 18 is repeated employing 15% by weight of the polycarbonate resin. The procedure, however, is modified in that a back pressure of 2,000 p.s.i. is utilized in the extruder with a temperature profile of: Zone 1=420° F.; Zone 2=580° F.; Zone 3=525° F. and die temperature=505° F. The pellets are molded into plaques according to the procedure of Example 1.

The properties of the resulting plaques of the alloy are given in Table III.

Example 21

The procedure of Example 18 is repeated employing 25% by weight of the polycarbonate resin. The procedure, however is modified in that a back pressure of 2,150 p.s.i. is utilized in the extruder with a temperature profile of: Zone 1=395° F.; Zone 2=565° F.; Zone 3=525° F. and die temperature=520° F. The pellets are molded into plaques according to the procedure of Example 1.

The properties of the resulting plaques of the alloy are given in Table III.

Example 22

The procedure of Example 18 is repeated employing 75% by weight of the polycarbonate resin. The procedure, however, is modified in that a back pressure of 3,900 p.s.i. is utilized in the extruder with a temperature profile of: Zone 1=440° F.; Zone 2=570° F.; Zone 3=520° F. and die temperature=510° F. The pellets are molded into plaques according to the procedure of Example 1.

The properties of the resulting plaques of the alloy are given in Table III.

TABLE III

| Example No. | Weight percent of graft copolymer | Weight percent of polycarbonate | Tensile strength at yield, p.s.i. | Percent elongation |
|---|---|---|---|---|
| 18 | 95 | 5 | 2,790 | 410 |
| Control A | 0 | 100 | 5,850 | 30 |
| 19 | 90 | 10 | 2,490 | 145 |
| 20 | 85 | 15 | | |
| 21 | 75 | 25 | 1,680 | 10 |
| 22 | 25 | 75 | 5,240 | 50 |

Example 23

A high density polyethylene/butene-1/dibutyl maleate graft copolymer is prepared and made into pellets in accordance with the procedure of Example 1.

Approximately 950 grams (95%) of the resulting pellets of the polyethylene/butene-1/dibutyl maleate graft copolymer are mixed with 50 grams (5%) of pellets (1/10 to 1/4 inch) of the polyoxymethylene (previously described) to form a homogeneous mixture. The mixture is then fed into a "Sterling" one inch extruder having a length to diameter ratio of 24 to 1 and equipped with electric temperature controls covering 3 heating zones. The temperature profile is: Zone 1=305–315° F.; Zone 2=370–390° F.; Zone 3=370° F. and die temperature=370–390° F. The die produces a single strand of the alloy at an extrusion rate of about 2.5 to about 3.5 pounds per hour employing a back pressure of about 3,000 p.s.i. The strand is cut into pellets having a size of from about 1/4 to about 1/16 inch.

About 24 grams of the resulting pellets are compression molded into plaques according to the procedure of Example 1.

The properties of the plaques of the alloy are given in Table IV.

Example 24

The procedure of Example 23 is repeated employing 10% by weight of the polyoxymethylene. The procedure, however, is modified in that a back pressure of 2,800 p.s.i. is utilized in the extruder. The pellets are molded into plaques according to the procedure of Example 1.

The properties of the resulting plaques of the alloy are given in Table IV.

Example 25

The procedure of Example 23 is repeated employing 15% by weight of the polyoxymethylene. The procedure, however, is modified in that a back pressure of 100 to 2,800 p.s.i. is utilized in the extruder. The pellets are molded into plaques according to the procedure of Example 1.

The properties of the resulting plaques of the alloy are given in Table IV.

Example 26

The procedure of Example 23 is repeated employing 25% by weight of the polyoxymethylene. The procedure, however, is modified in that a back pressure of 700 to 1,600 p.s.i. is utilized in the extruder. The pellets are molded into plaques according to the procedure of Example 1.

The properties of the resulting plaques of the alloy are given in Table IV.

*Example 27*

The procedure of Example 18 is repeated employing 75% by weight of the polyoxymethylene to form pellets of the alloy. The procedure, however, is modified in that a back pressure of 3,000 p.s.i. is utilized in the extruder.

The pellets of the alloy, however, could not be compression molded into plaques, but can be extrusion molded. The properties of the polymer are similar to that of the original polyoxymethylene (control) which is likewise not suitable for compression molding.

TABLE IV

| Example No. | Weight percent of graft copolymer | Weight percent of polyoxymethylene | Tensile strength at yield, p.s.i. | Ultimate tensile strength, p.s.i. | Percent elongation |
|---|---|---|---|---|---|
| 23 | 95 | 5 | 2,980 | 3,000 | 810 |
| 24 | 90 | 10 | 3,040 | 2,140 | 340 |
| 25 | 85 | 15 | 2,010 |  | 45 |
| 26 | 75 | 25 | 1,480 |  | 10 |
| 27 | 25 | 75 | (¹) | (¹) | (¹) |
| Control | 0 | 100 | (¹) | (¹) | (¹) |

¹ Not suitable for compression molding.

While in the above examples unmodified compositions are produced, it is obvious that other materials such as dyes, pigments, fibers and other polymers may be introduced into the composition of the present invention without substantial alteration of the physical properties of structures formed from such compositions.

The composition formed in accordance with the present invention can be fabricated into useful articles such as bottles, toys, sheets and films in the same manner as the original high density polyethylene homopolymer or copolymer. For example, the compositions of the present invention can be blow-molded, injection molded, compression molded, or extruded into films, bottles, tubing, filaments, sheets, wrapping materials and the like.

Many equivalent modifications will become apparent to those skilled in the art from a reading of the foregoing without a departure from the inventive concept.

What is claimed is:

1. A polymer composition comprising a blend of (1) a high molecular weight polymer selected from the group consisting of a polycarbonamide having recurring amide units as an integral part of the main polymer chain, polycarbonate having recurring carbonate units as an integral part of the main polymer chain and polyoxymethylene having the recurring —CH$_2$O— units as an integral part of the main polymer chain and (2) a graft copolymer of (A) a polyethylene polymer having a density of at least about 0.940 and containing at least about 90% by weight of ethylene in the polymer chain and (B) a maleic acid diester of a monohydric alcohol, the maleic acid diester being present in the graft copolymer in amounts of from about 0.5 to about 12% by weight.

2. A polymer composition comprising a blend of (1) a high molecular weight polymer selected from the group consisting of a polycarbonamide having recurring amide units as an integral part of the main polymer chain, polycarbonate having recurring carbonate units as an integral part of the main polymer chain and polyoxymethylene having the recurring —CH$_2$O— units as an integral part of the main polymer chain and (2) a graft copolymer of (A) a polyethylene polymer having a density of from about 0.942 to about 0.965 and containing at least about 98% by weight of ethylene in the polymer chain and (B) a maleic acid diester of a monohydric alcohol, the maleic acid diester being present in the graft copolymer in amounts of from about 3 to about 10% by weight.

3. A polymer composition comprising a blend of (1) a high molecular weight polycarbonamide having recurring amide units as an integral part of the main polymer chain and (2) a graft copolymer of (A) a polyethylene polymer having a density of from about 0.942 to about 0.965 and containing at least about 98% by weight of ethylene in the polymer chain and (B) a maleic acid diester of a monohydric alcohol, the maleic acid diester being present in the graft copolymer in amounts of from about 3 to about 10% by weight.

4. A polymer composition comprising a blend of (1) a high molecular weight polycarbonate having recurring carbonate units as an integral part of the main polymer chain and (2) a graft copolymer of (A) a polyethylene polymer having a density of from about 0.942 to about 0.965 and containing at least about 98% by weight of ethylene in the polymer chain and (B) a maleic acid diester of a monohydric alcohol, the maleic acid diester being present in the graft copolymer in amounts of from about 3 to about 10% by weight.

5. A polymer composition comprising a blend of (1) a high molecular weight polyoxymethylene having the recurring —CH$_2$O— units as an integral part of the main polymer chain and (2) a graft copolymer of (A) a polyethylene polymer having a density of from about 0.942 to about 0.965 and containing at least about 98% by weight of ethylene in the polymer chain and (B) a maleic acid diester of a monohydric alcohol, the maleic acid diester being present in the graft copolymer in amounts of from about 3 to about 10% by weight.

6. The composition of claim 1 wherein the maleic acid diester is dibutyl maleate.

7. The composition of claim 1 wherein the maleic acid diester is diethyl maleate.

8. The composition of claim 2 wherein the maleic acid diester is dibutyl maleate.

9. The composition of claim 2 wherein the maleic acid diester is diethyl maleate.

10. The composition of claim 3 wherein the maleic acid diester is dibutyl maleate.

11. The composition of claim 4 wherein the maleic acid diester is dibutyl maleate.

12. The composition of claim 5 wherein the maleic acid diester is dibutyl maleate.

References Cited by the Examiner

UNITED STATES PATENTS 2,302,332  11/1942  Leekley _____ 260—875

FOREIGN PATENTS 634,179  1/1962  Canada.

MURRAY TILLMAN, *Primary Examiner.*

JAMES A. SEIDLECK, *Examiner.*

N. W. S. HUST, *Assistant Examiner.*